(12) United States Patent
Hwang et al.

(10) Patent No.: US 11,898,965 B2
(45) Date of Patent: Feb. 13, 2024

(54) INSPECTION APPARATUS FOR DISPLAY MODULE INCLUDING A SEAT PART HAVING RECESS PART

(71) Applicant: Samsung Display Co., Ltd., Yongin-si (KR)

(72) Inventors: Seongmo Hwang, Seongnam-si (KR); Jeong-Hwan Shin, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 15 days.

(21) Appl. No.: 17/496,444

(22) Filed: Oct. 7, 2021

(65) Prior Publication Data

US 2022/0252521 A1  Aug. 11, 2022

(30) Foreign Application Priority Data

Feb. 10, 2021  (KR) .................... 10-2021-0018904

(51) Int. Cl.
  *G09G 3/00* (2006.01)
  *G01N 21/88* (2006.01)
  *G02F 1/13* (2006.01)
(52) U.S. Cl.
  CPC ....... *G01N 21/8803* (2013.01); *G02F 1/1309* (2013.01); *G09G 3/006* (2013.01)
(58) Field of Classification Search
  CPC .................... G01N 21/8803; G02F 1/1309
  See application file for complete search history.

(56) References Cited

U.S. PATENT DOCUMENTS

| 5,459,594 A * | 10/1995 | Nakanishi ............. G02F 1/1309 349/1 |
| 9,613,551 B2 | 4/2017 | Lee et al. |
| 2013/0200913 A1* | 8/2013 | Panagas ................. G06F 3/044 324/756.02 |
| 2014/0118910 A1* | 5/2014 | Sung ................. G02F 1/133305 361/679.01 |
| 2014/0160564 A1* | 6/2014 | Wei ...................... G02F 1/1309 359/483.01 |
| 2016/0274386 A1* | 9/2016 | Lv ............................. G01J 1/42 |
| 2019/0299369 A1* | 10/2019 | Lee ................... G02F 1/133528 |

FOREIGN PATENT DOCUMENTS

| KR | 10-2007-0117188 A | 12/2007 |
| KR | 10-1570215 B1 | 11/2015 |
| KR | 20-0488774 Y1 | 3/2019 |
| KR | 10-2037069 B1 | 10/2019 |
| KR | 10-2038983 B1 | 11/2019 |
| KR | 10-2158539 B1 | 9/2020 |

* cited by examiner

*Primary Examiner* — Sanghyuk Park
(74) *Attorney, Agent, or Firm* — Lewis Roca Rothgerber Christie LLP

(57) ABSTRACT

An inspection apparatus for a display module includes a seat part in which a first recess part including a bottom surface and a side surface extending from the bottom surface is defined, and an inspection part including an inspection connector. The seat part includes a support part having a certain stiffness and located on the bottom surface and a variable part connecting the support part and the side surface. The variable part has a certain elasticity or a portion of the variable part penetrates into the side surface.

20 Claims, 12 Drawing Sheets

INSPECTION APPARATUS FOR DISPLAY MODULE INCLUDING A SEAT PART HAVING RECESS PART

CROSS-REFERENCE TO RELATED APPLICATION

This application claims priority to and the benefit of Korean Patent Application No. 10-2021-0018904, filed on Feb. 10, 2021 in the Korean Intellectual Property Office, the entire content of which is hereby incorporated by reference.

BACKGROUND

1. Field

Aspects of embodiments of the present disclosure relate to an inspection apparatus for a display module.

2. Description of the Related Art

A display device displays various images through a display screen to provide a user with information. The display device includes a display module to display the images through the display screen. The display module includes a display panel displaying the images, a window protecting the display panel, and a circuit board transmitting signals to the display panel. In addition, the display module further includes an input sensing layer to recognize a user's input and a circuit board to transmit signals to the input sensing layer. That is, the display module transmits signals from the outside to the display panel or the input sensing layer through the circuit board.

Meanwhile, as various display devices are developed, the display module has a variety of sizes. Accordingly, an inspection apparatus for the display module is being developed to accommodate the display modules with various sizes.

SUMMARY

According to an aspect of embodiments of the present disclosure, a display module inspection apparatus capable of accommodating various sizes of display modules is provided.

According to one or more embodiments, a display module inspection apparatus includes a seat part in which a first recess part including a bottom surface and a side surface extending from the bottom surface is defined, and an inspection part including an inspection connector. The seat part includes a support part having a certain stiffness and located on the bottom surface, and a variable part connecting the support part and the side surface. The variable part has a certain elasticity or a portion of the variable part penetrates into the side surface.

In one or more embodiments, the variable part includes a spring or a screw.

In one or more embodiments, the variable part is provided in plural.

In one or more embodiments, the variable part includes a first variable part, a second variable part, a third variable part, and a fourth variable part, the support part comprises a first support part, a second support part, a third support part, and a fourth support part, which are spaced apart from each other, and the first variable part, the second variable part, the third variable part, and the fourth variable part are connected to the first support part, the second support part, the third support part, and the fourth support part, respectively.

In one or more embodiments, the first support part, the second support part, the third support part, and the fourth support part are spaced apart from each other.

In one or more embodiments, the first support part faces the third support part, and the second support part faces the fourth support part.

In one or more embodiments, the seat part further includes a cushion part located in the first recess part along the side surface and surrounding the first, second, third, and fourth support parts.

In one or more embodiments, the seat part further includes a second recess part spaced apart from the first recess part and having a recessed shape, and the inspection part overlaps the second recess part.

In one or more embodiments, the inspection part includes two protrusion parts and two sub-variable parts respectively connected to the two protrusion parts, which are located on a surface of the inspection part, both ends of the inspection connector are respectively connected to the two sub-variable parts, and the sub-variable parts have the certain elasticity or a portion of the sub-variable parts penetrates into the protrusion parts.

In one or more embodiments, each of the sub-variable parts includes a spring or a screw.

In one or more embodiments, the support part has a bent-bar shape that is bent at an angle.

In one or more embodiments, the bottom surface is parallel to a first direction and a second direction crossing the first direction, and the side surface is parallel to a third direction crossing the first and second directions.

In one or more embodiments, the seat part includes a metal material.

In one or more embodiments, the support part includes at least one of a metal material and a ceramic material.

According to one or more embodiments, a display module inspection apparatus includes: a seat part in which a first recess part and a second recess part, each having a recessed shape, are defined, and an inspection part overlapping the second recess part and including an inspection connector. The seat part includes a support part overlapping the first recess part and including a shape-memory alloy.

In one or more embodiments, the support part includes a first support part, a second support part, a third support part, and a fourth support part, which are spaced apart from each other.

In one or more embodiments, each of the first, second, third, and fourth support parts has a bent-bar shape that is bent at an angle.

In one or more embodiments, the seat part further includes a cushion part disposed in the first recess part and surrounding the first, second, third, and fourth support parts.

In one or more embodiments, the inspection connector includes a plurality of connection pin insertion parts.

In one or more embodiments, the inspection part is provided with two protrusion parts and two sub-variable parts respectively connected to the two protrusion parts, which are located on a surface of the inspection part, both ends of the inspection connector are respectively connected to the two sub-variable parts, and the sub-variable parts have a certain elasticity or a portion of the sub-variable parts penetrates into the protrusion parts.

According to an aspect of one or more embodiments, the display module inspection apparatus accommodates display modules with various sizes.

According to another aspect of one or more embodiments, the display module inspection apparatus is capable of being used to inspect the display modules of various sizes, and, thus, a production cost required to manufacture a new inspection apparatus is reduced.

BRIEF DESCRIPTION OF THE DRAWINGS

The above and other aspects and advantages of the present disclosure will become readily apparent by reference to the following detailed description when considered in conjunction with the accompanying drawings, wherein.

DETAILED DESCRIPTION

Figure 1:
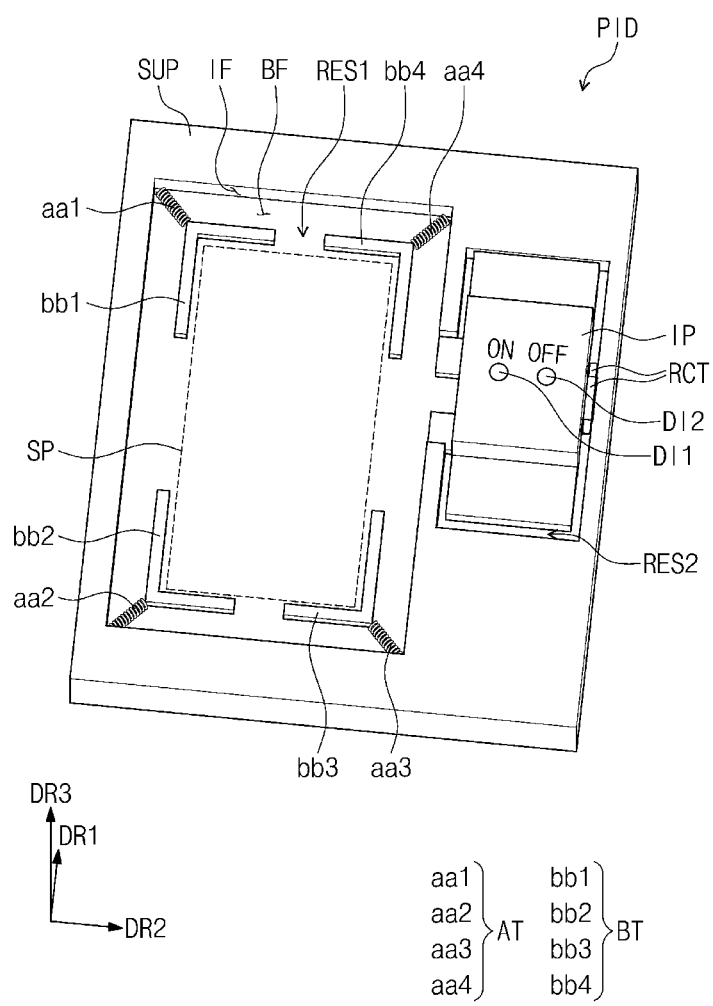
FIGS. 1 and 2 are perspective views showing an inspection apparatus for a display module according to an embodiment of the present disclosure.

In the present disclosure, it is to be understood that when an element or layer is referred to as being "on," "connected to," or "coupled to" another element or layer, it may be directly on, connected, or coupled to the other element or layer, or one or more intervening elements or layers may be present.

Like numerals refer to like elements throughout. In the drawings, the thicknesses, ratios, and dimensions of components may be exaggerated for effective description of the technical content.

As used herein, the term "and/or" includes any and all combinations of one or more of the associated listed items.

It is to be understood that, although the terms "first," "second," etc. may be used herein to describe various elements, these elements should not be limited by these terms. These terms are used to distinguish one element from another element. Thus, a first element discussed below could be termed a second element without departing from the teachings of the present disclosure. As used herein, the singular forms "a," "an," and "the" are intended to include the plural forms as well, unless the context clearly indicates otherwise.

Spatially relative terms, such as "beneath," "below," "lower," "above," "upper," and the like, may be used herein for ease of description to describe one element or feature's relationship to another element or feature as shown in the figures.

Unless otherwise defined, all terms including technical and scientific terms used herein have the same meaning as commonly understood by one of ordinary skill in the art to which this disclosure belongs. It is to be further understood that terms, such as those defined in commonly used dictionaries, should be interpreted as having a meaning that is consistent with their meaning in the context of the relevant art and are not to be interpreted in an idealized or overly formal sense unless expressly so defined herein.

It is to be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Herein, an inspection apparatus PID for a display module according to an embodiment of the present disclosure will be explained in further detail with reference to the accompanying drawings.

Figure 2:
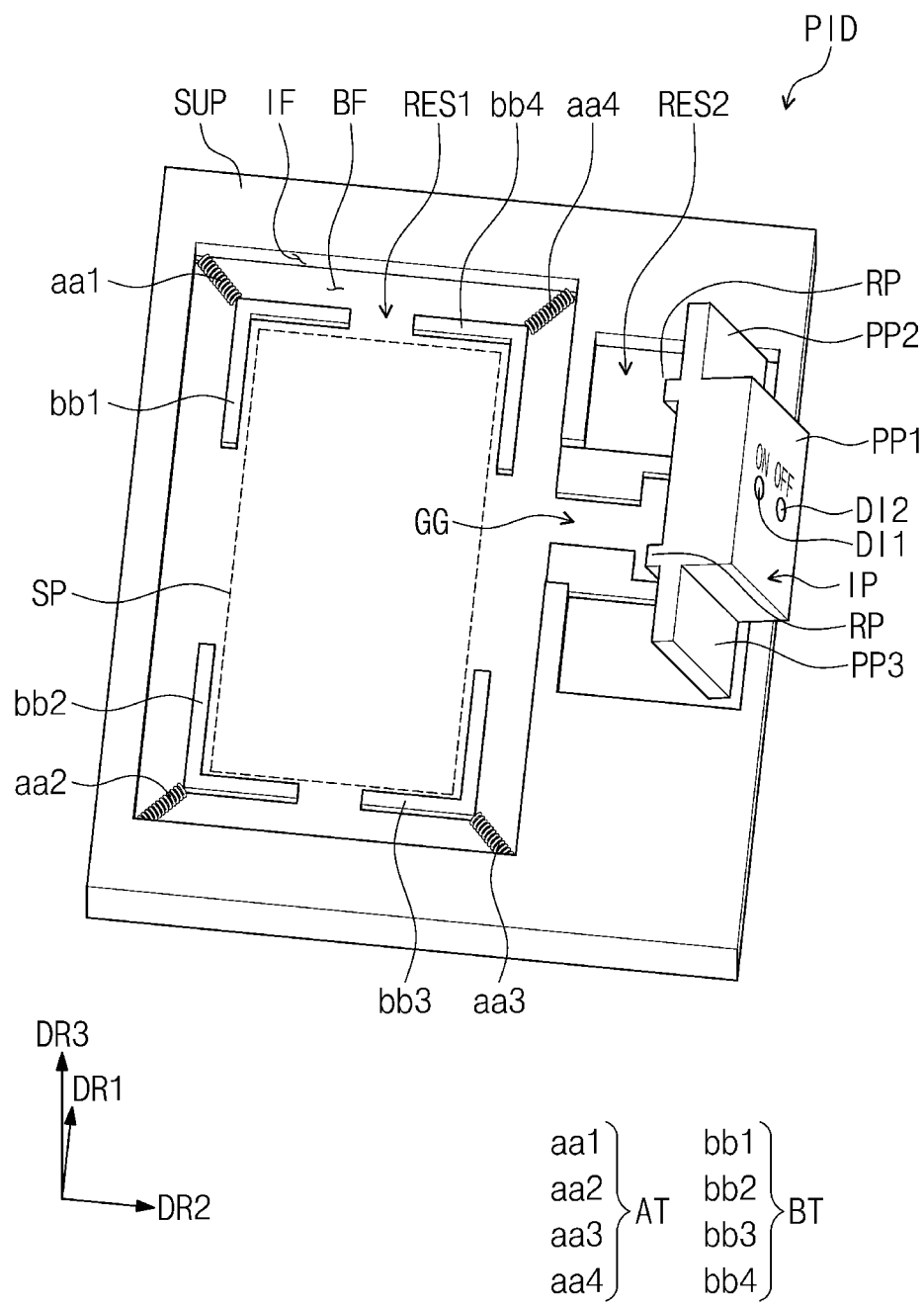

FIGS. 1 and 2 are perspective views showing the inspection apparatus PID for a display module according to an embodiment of the present disclosure.

Referring to FIG. 1, the display module inspection apparatus PID may include a seat part SUP in which a first recess part RES1 and a second recess part RES2 are defined, an inspection part IP connected to the seat part SUP, a first display part DI1 connected to the inspection part IP, and a second display part DI2 connected to the inspection part IP.

The seat part SUP may be parallel (parallel or substantially parallel) to a plane defined by a first direction DR1 and a second direction DR2 crossing the first direction DR1. Herein, a direction perpendicular (perpendicular or substantially perpendicular) to the plane defined by the first and second directions DR1 and DR2 may be referred to as a third direction DR3. As an example, the seat part SUP may have a quadrangular shape when viewed in the third direction DR3.

In an embodiment, the seat part SUP may include a metal material. As an example, the seat part SUP may include SUS.

The first recess part RES1 may be defined in an upper surface of the seat part SUP. For example, the first recess part RES1 may be formed by recessing downward the upper surface of the seat portion SUP from the upper surface of the seat part SUP. The first recess part RES1 may include a bottom surface BF and a side surface IF extending from the bottom surface BF. According to an embodiment, the bottom surface BF may be parallel (parallel or substantially parallel) to the plane defined by the first direction DR1 and the second direction DR2. As an example, the bottom surface BF may have a rectangular shape defined by long sides extending in the first direction DR1 and short sides extending in the second direction DR2.

The side surface IF may extend in the third direction DR3 from the bottom surface BF.

A variable part AT and a support part BT may be disposed in the first recess part RES1.

The support part BT may be disposed on the bottom surface BF. The variable part AT may connect the support part BT and the side surface IF.

The variable part AT may have a certain elasticity (e.g., a predetermined elasticity), or a portion of the variable part AT may penetrate into the side surface IF. A distance between the support part BT and the side surface IF may be adjusted by the variable part AT. As an example, the variable part AT may include a spring or a screw. FIGS. 1 and 2 show the spring as a representative example of the variable part AT. When the spring is employed as the variable part AT, the distance between the support part BT and the side surface IF may be adjusted by an external force applied to the support part BT; however, embodiments are not limited thereto or thereby. In an embodiment, the variable part AT may be a screw. When the screw is employed as the variable part AT, at least a portion of the screw may be inserted into the side surface IF to adjust the distance between the support part BT and the side surface IF. That is, the distance between the support part BT and the side surface IF may be adjusted by adjusting the elasticity of the variable part AT or a length of the variable part AT, which is exposed to the outside.

According to an embodiment, each of the variable part AT and the support part BT may be provided in plural. As an example, the variable part AT may include a first variable part aa1, a second variable part aa2, a third variable part aa3, and a fourth variable part aa4. The first variable part aa1, the second variable part aa2, the third variable part aa3, and the fourth variable part aa4 may be spaced apart from each other, however, embodiments are not limited thereto or thereby. For example, according to an embodiment, the number of the variable parts AT may be one, two, three, or five or more.

The first variable part aa1, the second variable part aa2, the third variable part aa3, and the fourth variable part aa4 may be connected to a first support part bb1, a second support part bb2, a third support part bb3, and a fourth support part bb4, respectively. The first support part bb1, the second support part bb2, the third support part bb3, and the fourth support part bb4 may be spaced apart from each other. In addition, according to an embodiment, each of the first support part bb1, the second support part bb2, the third support part bb3, and the fourth support part bb4 may have a bent-bar shape that is bent at an angle (e.g., a predetermined angle).

As an example, the first support part bb1 may be spaced apart from the third support part bb3 to face the third support part bb3, and the second support part bb2 may be spaced apart from the fourth support part bb4 to face the fourth support part bb4. In an embodiment, each of the first support part bb1, the second support part bb2, the third support part bb3, and the fourth support part bb4 may have a shape that is bent at an angle of about 90 degrees. Accordingly, each of the first support part bb1, the second support part bb2, the third support part bb3, and the fourth support part bb4 may include a square-shaped corner. A seat space SP surrounded by the first support part bb1, the second support part bb2, the third support part bb3, and the fourth support part bb4 and having a quadrangular shape may be defined in the first recess part RES1; however, embodiments are not limited thereto or thereby. For example, the seat space SP may have any of a variety of shapes depending on the bent angle and the shape of the first support part bb1, the second support part bb2, the third support part bb3, and the fourth support part bb4.

An inspection object of the display module inspection apparatus PID may be disposed in the seat space SP. As an example, a display module described later may be disposed in the seat space SP.

In an embodiment, the support part BT may include a metal or ceramic material. The support part BT may have a certain stiffness and may stably support the display module that is the inspection object. This will be described in further detail later.

As described above, as the length of the variable part AT is adjusted, the distance between the side surface IF and the support part BT may be adjusted, and, thus, a size of the seat space SP may be adjusted. As an example, the size of the seat space SP may be adjusted according to a size of the display module that is the inspection object. Accordingly, the display module inspection apparatus PID may accommodate display modules of various sizes.

The second recess part RES2 may be disposed in the seat part SUP to be spaced apart from the first recess part RES1. The second recess part RES2 may have a shape recessed downward from the upper surface of the seat part SUP. The inspection part IP may be disposed to overlap the second recess part RES2. In further detail, the inspection part IP may be disposed in the second recess part RES2.

A side of the inspection part IP may be connected to the seat part SUP by a connection part RCT. As an example, the connection part RCT may be a hinge. As the connection part RCT is rotated, the side of the inspection part IP may be rotated. For example as shown in FIG. 1, the inspection part IP may overlap the second recess part RES2. In further detail, the inspection part IP may be disposed in the second recess part RES2. As shown in FIG. 2, the inspection part IP may be spaced apart from the second recess part RES2. A state in which the inspection part IP is disposed in the second recess part RES2 may be referred to as a closed state of the inspection part IP. A state in which the inspection part IP is spaced apart from the second recess part RES2 may be referred to as an opened state of the inspection part IP.

Referring to FIG. 2, when the inspection part IP is opened, a guide groove GG defined in the seat part SUP may be exposed to the outside. The guide groove GG may extend from the first recess part RES1 and may have a recessed shape. The guide groove GG may extend in a direction toward the second recess part RES2 from the first recess part RES1, and at least a portion of the guide groove GG may overlap the second recess part RES2.

The inspection part IP may include a first part PP1, a second part PP2 extending in one direction from the first part PP1, and a third part PP3 extending in another direction opposite to the one direction from the first part PP1. In an embodiment, the second part PP2 may extend in the first direction DR1 from the first part PP1. The third part PP3 may extend in a direction opposite to the first direction DR1 from the first part PP1.

The first part PP1 may include an upper surface parallel (parallel or substantially parallel) to the plane defined by the first direction DR1 and the second direction DR2. The first display part DI1 and the second display part DI2 may be disposed on the upper surface of the first part PP1. The first display part DI1 and the second display part DI2 may be exposed to a user. According to an embodiment, the first and second display parts DI1 and DI2 may be arranged in the second direction DR2. In an embodiment, a word "ON" indicating a normal state may be marked on the upper surface of the inspection part IP adjacent to the first display part DI1, and a word "OFF" indicating a defective state may be marked on the upper surface of the inspection part IP adjacent to the second display part DI2. In an embodiment, each of the first and second display parts DI1 and DI2 may emit a light.

Figure 3:
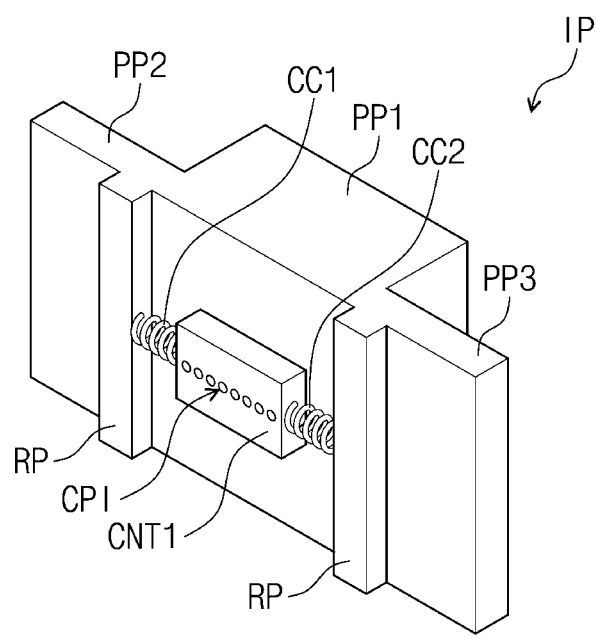
FIG. 3 is a perspective view showing an inspection part according to an embodiment of the present disclosure.
Figure 3:
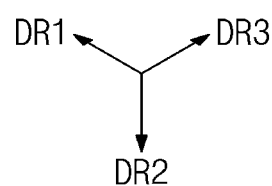

FIG. 3 is a perspective view showing the inspection part IP according to an embodiment of the present disclosure. The inspection part IP may include an inspection connector.

The first part PP1 may include two protrusion parts RP protruded from a lower portion thereof to a direction opposite to the third direction DR3. The two protrusion parts RP may be spaced apart from each other and may extend in the second direction DR2.

The inspection connector may be disposed between the two protrusion parts RP. According to an embodiment, the inspection connector may include a first connector CNT1. In an embodiment, the first connector CNT1 may include a female terminal. As an example, the first connector CNT1 may include n connection pin insertion parts CPI including female type connector pins.

The connection pin insertion parts CPI may be arranged in the first direction DR1. As an example, the connection pin insertion parts CPI arranged in a line are shown; however, embodiments are not limited thereto or thereby. According to an embodiment, the connection pin insertion parts CPI may be arranged in plural lines. According to an embodiment, the connection pin insertion parts CPI may be arranged in the second direction DR2.

In an embodiment, the two protrusion parts RP may be connected to a first sub-variable part CC1 and a second sub-variable part CC2, respectively. One end of the first sub-variable part CC1 may be connected to one of the protrusion parts RP, and the other end of the first sub-variable part CC1 may be connected to one end of the first connector CNT1. One end of the second sub-variable part CC2 may be connected to the other of the protrusion parts RP, and the other end of the second sub-variable part CC2 may be connected to the other end of the first connector CNT1. That is, the first connector CNT1 may be connected to the two protrusion parts RP by the first and second sub-variable parts CC1 and CC2. In an embodiment, the first connector CNT1 may be attachable to and detachable from the first and second sub-variable parts CC1 and CC2.

Each of the first and second sub-variable parts CC1 and CC2 may have a certain elasticity or may penetrate into the protrusion part RP. As an example, each of the first and second sub-variable parts CC1 and CC2 may include a spring or a screw. FIG. 3 shows the spring as a representative example of the first and second sub-variable parts CC1 and CC2. The first and second sub-variable parts CC1 and CC2 may accommodate the first connector CNT1 of various sizes therebetween by compressing or stretching a length of the spring depending on a size of the first connector CNT1.

As another example, when the screw is employed as the two sub-variable parts CC1 and CC2, the screw may be inserted into the protrusion part RP, and a length of the screw exposed outside the protrusion part RP may be adjusted. That is, the length of the first and second sub-variable parts CC1 and CC2 exposed outside the protrusion part RP may be adjusted depending on the size of the first connector CNT1.

In an embodiment, the first connector CNT1 that is the inspection connector may be changed depending on the size of a display module DM disposed in the seat space SP (refer to FIG. 1). In this case, although the size of the first connector CNT1 may be changed, the display module inspection apparatus PID may accommodate the first connector CNT1 of various sizes due to the sub-variable parts CC1 and CC2 included in the inspection part IP.

According to the display module inspection apparatus PID of the present disclosure, the seat part SUP may include the variable part AT and may adjust the size of the seat space SP of the display module. In addition, since the inspection part IP includes the sub-variable parts CC1 and CC2, the display module inspection apparatus PID may accommodate the first connector CNT1 of various sizes. Accordingly, the display module inspection apparatus PID may accommodate and may inspect the display module DM of various sizes.

Herein, the display module DM that is an inspection object will be described with reference to FIGS. 4A to 4C.

Figure 4A:
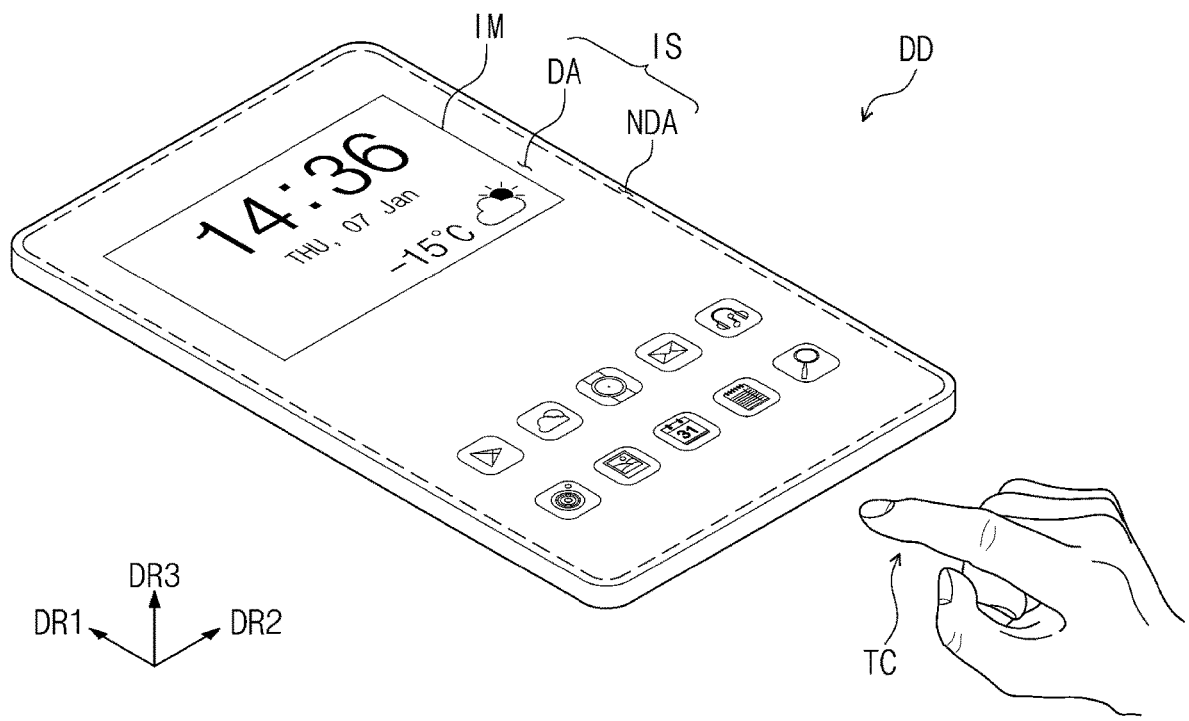
FIG. 4A is a perspective view showing a display device according to an embodiment of the present disclosure.

FIG. 4A is a perspective view showing a display device DD according to an embodiment of the present disclosure; FIG. 4B is an exploded perspective view showing the display module DM according to an embodiment of the present disclosure; and FIG. 4C is a plan view showing the display module DM according to an embodiment of the present disclosure.

Referring to FIG. 4A, the display device DD may include a display surface IS parallel (parallel or substantially parallel) to the first direction DR1 and the second direction DR2. The display surface IS may display an image IM to the third direction DR3. The display surface IS in which the image IM is displayed may correspond to a front surface of the display device DD.

FIG. 4A shows a smartphone as a representative example of the display device DD; however, the display device DD is not limited to the smartphone. For example, the display device DD according to the present disclosure may be applied to any of a large-sized electronic item, such as a television set and a monitor, and a small and medium-sized electronic item, such as a tablet computer, a car navigation unit, a game unit, and a smart watch.

As shown in FIG. 4A, the display surface IS of the display device DD may include a plurality of areas defined therein. The display surface IS of the display device DD may be divided into the plural areas. The display surface IS of the display device DD may include a display area DA and a non-display area NDA, which are defined therein.

The display area DA may be an area in which the image IM is displayed, and the user may view the image IM through the display area DA. In an embodiment, the display area DA may have a quadrangular shape. In an embodiment, the non-display area NDA may surround the display area DA. Accordingly, the display area DA may have a shape substantially defined by the non-display area NDA; however, this is merely one example. According to an embodiment, the non-display area NDA may be disposed to be adjacent to only one side of the display area DA or may be omitted.

The non-display area NDA may be an area defined adjacent to the display area DA, and the image IM may not be displayed through the non-display area NDA. In an embodiment, the non-display area NDA may define a bezel area of the display device DD.

In an embodiment, the non-display area NDA may surround the display area DA; however, this is merely one example. According to an embodiment, the non-display area NDA may be defined to be adjacent to only a portion of an edge of the display area DA, and embodiments are not particularly limited.

In an embodiment, the display device DD may sense a user input TC applied thereto from the outside of the display device DD. The user input TC may include any of various types of external inputs, such as a part of a user's body, light, heat, or pressure. In the present embodiment, the user input TC is shown as a hand of a user applied to the front surface of the display device DD; however, this is merely one example. As described above, the user input TC may be provided in various ways, e.g., an input applied by the hand of the user, an input applied by a tool, such as a touch pen or a stylus pen, etc. In addition, the display device DD may sense the user input TC applied to a side surface or a rear surface of the display device DD according to a structure of the display device DD; however, embodiments are not particularly limited.

In an embodiment, the display device DD may activate the display surface IS to display the image IM and may concurrently (e.g., substantially simultaneously) sense the user input TC. In the present embodiment, an area in which the user input TC is sensed may be defined in the display area DA through which the image IM is displayed; however, this is merely one example. According to an embodiment, the area in which the user input TC is sensed may be defined in the non-display area NDA or may be defined in an entire area of the display surface IS.

Figure 4B:
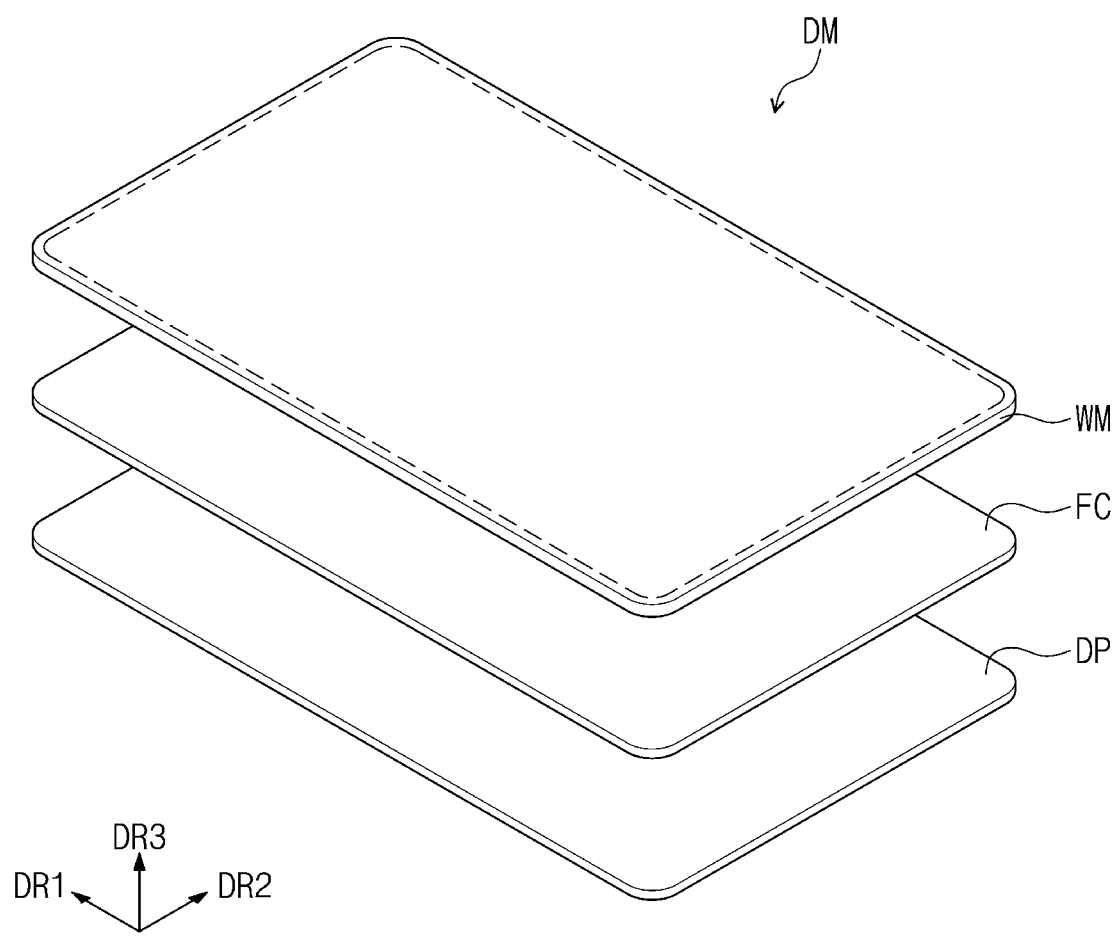
FIG. 4B is an exploded perspective view showing a display module according to an embodiment of the present disclosure.

FIG. 4B schematically shows the display module DM included in the display device DD. Referring to FIG. 4B, the display module DM may include a display panel DP displaying an image and a window WM disposed on the display panel DP.

In an embodiment, the display panel DP may be an organic light emitting diode display panel, a quantum dot display panel, a liquid crystal display panel, a plasma display panel, an electrophoretic display panel, a microelectromechanical system (MEMS) display panel, or an electrowetting display panel.

An upper surface of the window WM may define the display surface IS of the display device DD shown in FIG. 4A. The window WM may be optically transparent. Therefore, the image generated by the display panel DP may be easily viewed to the user through the window WM.

In an embodiment, the window WM may include a flexible material. Accordingly, the window WM may be folded or unfolded. As a result, when the display panel DP is folded or unfolded, a shape of the window WM may be changed together with the display panel DP.

The window WM may transmit the image generated by the display panel DP and may alleviate external impacts, and, thus, the window WM may protect the display panel DP. As an example, the window WM may prevent or substantially prevent the display panel DP from being damaged or from malfunctioning due to the external impacts. The external impacts may indicate stimuli causing defects in the display panel DP due to external forces, such as pressure, stress, etc. The window WM may alleviate a bending deformation, a compression deformation, and/or a tensile deformation of the display panel DP, which may be caused by a point impact and a surface impact, and, thus, may prevent or substantially prevent defects in the display panel DP from occurring.

At least one functional layer FC may be disposed between the display panel DP and the window WM. As an example, the functional layer FC may be an anti-reflective layer to block a reflection of an external light. The anti-reflective layer may prevent or substantially prevent elements in the display panel DP from being viewed from the outside due to the external light incident through the front surface of the display device DD. The anti-reflective layer may include a polarization film and/or a retarder film. The number of retarder films and a phase delay length of the retarder film may be determined according to the principle of operation of the anti-reflective layer.

In an embodiment, the functional layer FC may further include an input sensing layer that senses the user input TC (refer to FIG. 4A). As an example, the input sensing layer may be disposed directly on the display panel DP through successive processes. In the present disclosure, the expression that the input sensing layer is disposed directly on the display panel DP means that the input sensing layer is disposed on the display panel DP without a separate adhesive layer therebetween.

FIG. 4B shows a structure in which the functional layer FC is disposed on an upper surface of the display panel DP; however, the present disclosure is not limited thereto or thereby. According to an embodiment, the functional layer FC may be disposed on a lower surface of the display panel DP.

An adhesive layer may be further disposed between the window WM and the functional layer FC and between the functional layer FC and the display panel DP. For example, the adhesive layer may be a pressure sensitive adhesive (PSA), an optical clear adhesive (OCA), or an optical clear resin (OCR).

Figure 4C:
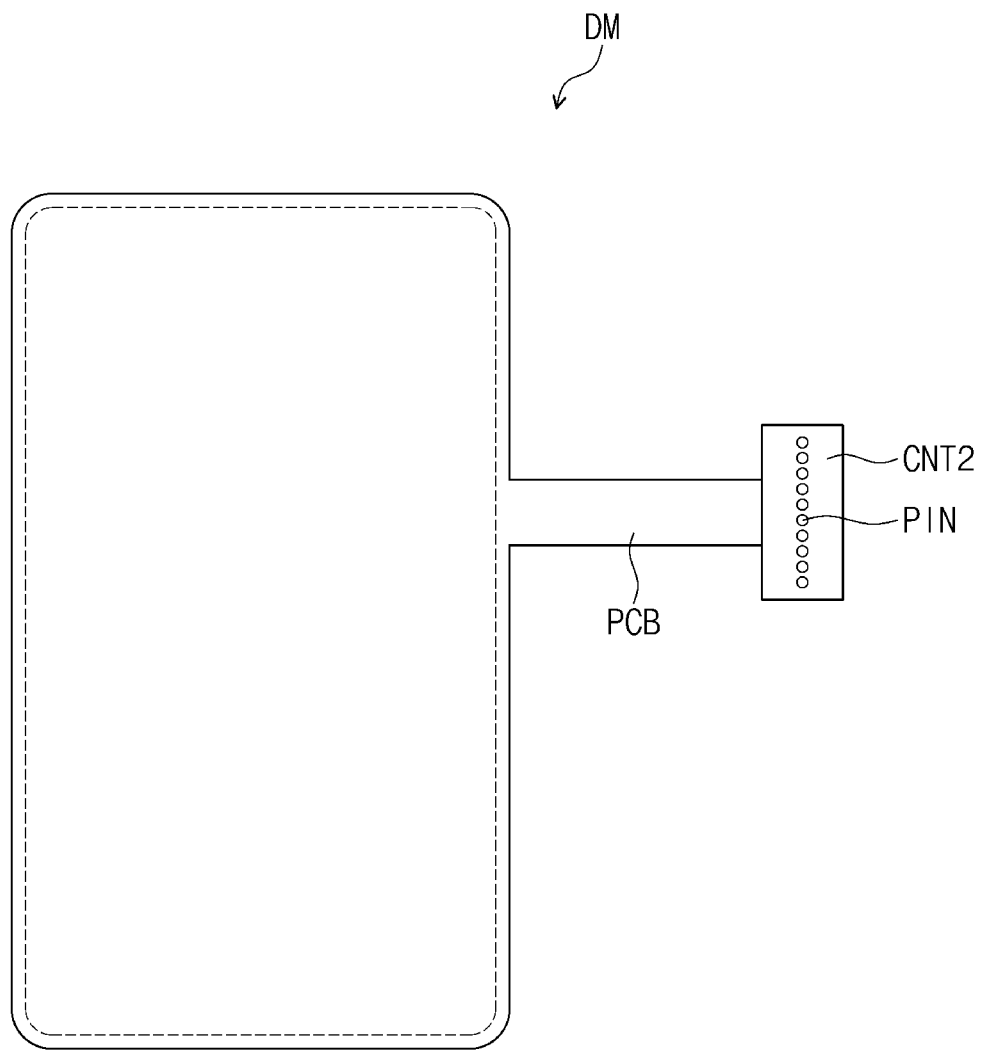
FIG. 4C is a plan view showing a display module according to an embodiment of the present disclosure.
Figure 4C:
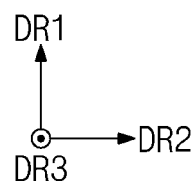

Referring to FIG. 4C, the display module DM may further include a circuit board PCB and a second connector CNT2. The circuit board PCB may be connected to at least one of the display panel DP and the functional layer FC. In an embodiment, the circuit board PCB may be a flexible circuit board. FIG. 4C shows one circuit board PCB as a representative example; however, embodiments are not limited thereto or thereby. According to an embodiment, the display module DM may include two or more circuit boards PCB.

The second connector CNT2 may be disposed on the circuit board PCB. The second connector CNT2 may transmit electrical signals to the display module DM via the circuit board PCB. In an embodiment, the second connector CNT2 may include a male terminal. As an example, the second connector CNT2 may include n connection pins PIN including male type connector pins. The connection pins PIN may be arranged in the first direction DR1. As an example, the connection pins PIN arranged in one line are shown; however, the present disclosure is not limited thereto or thereby. According to an embodiment, the connection pins PIN may be arranged in a plurality of lines. According to an embodiment, the connection pins PIN may be arranged in the second direction DR2.

The n connection pins PIN of the second connector CNT2 may be inserted into the n connection pin insertion parts CPI (refer to FIG. 3) of the first connector CNT1 (refer to FIG. 3).

Figure 5A:
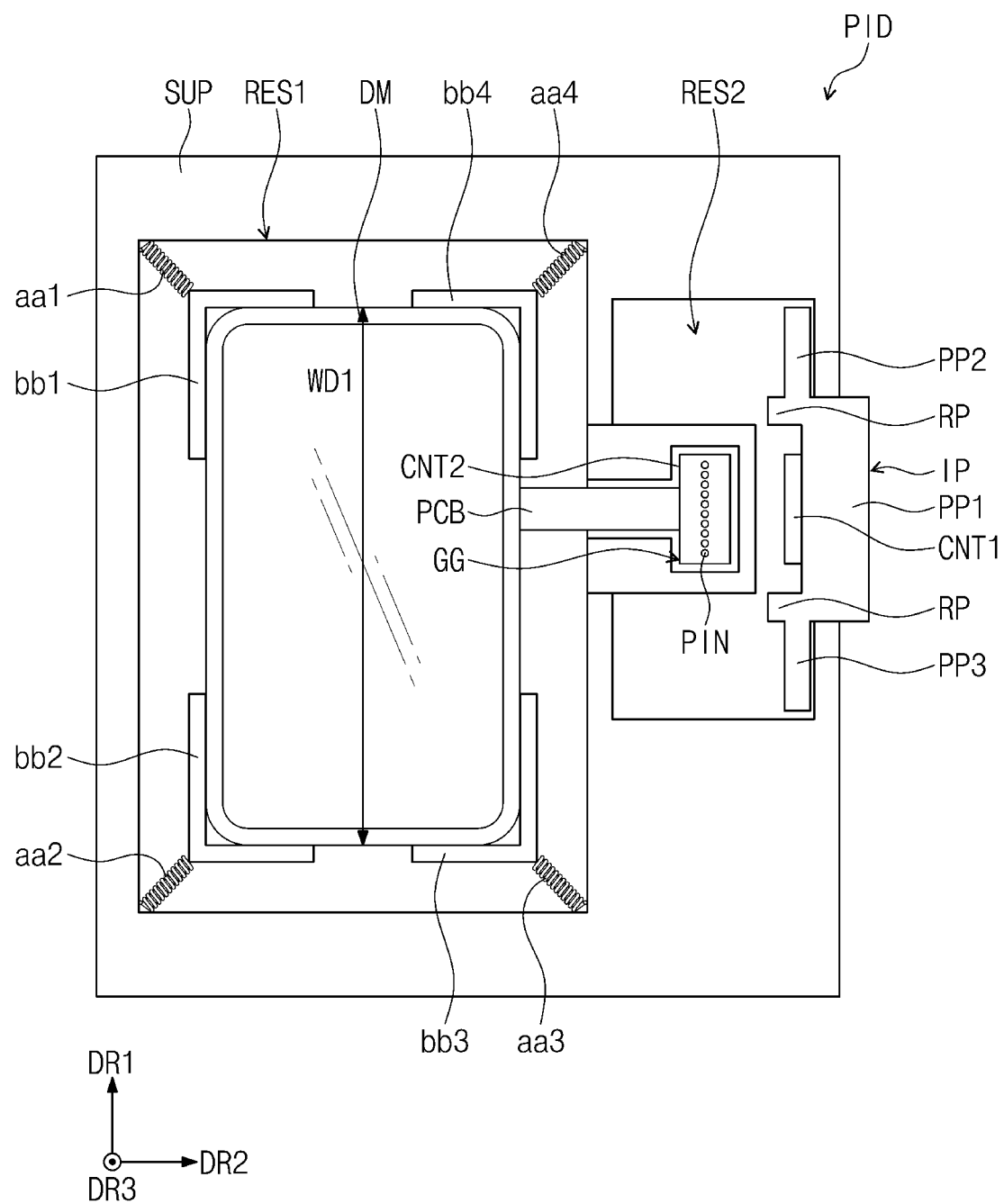
FIG. 5A is a plan view showing a display module placed on an inspection apparatus for a display module according to an embodiment of the present disclosure.
Figure 5B:
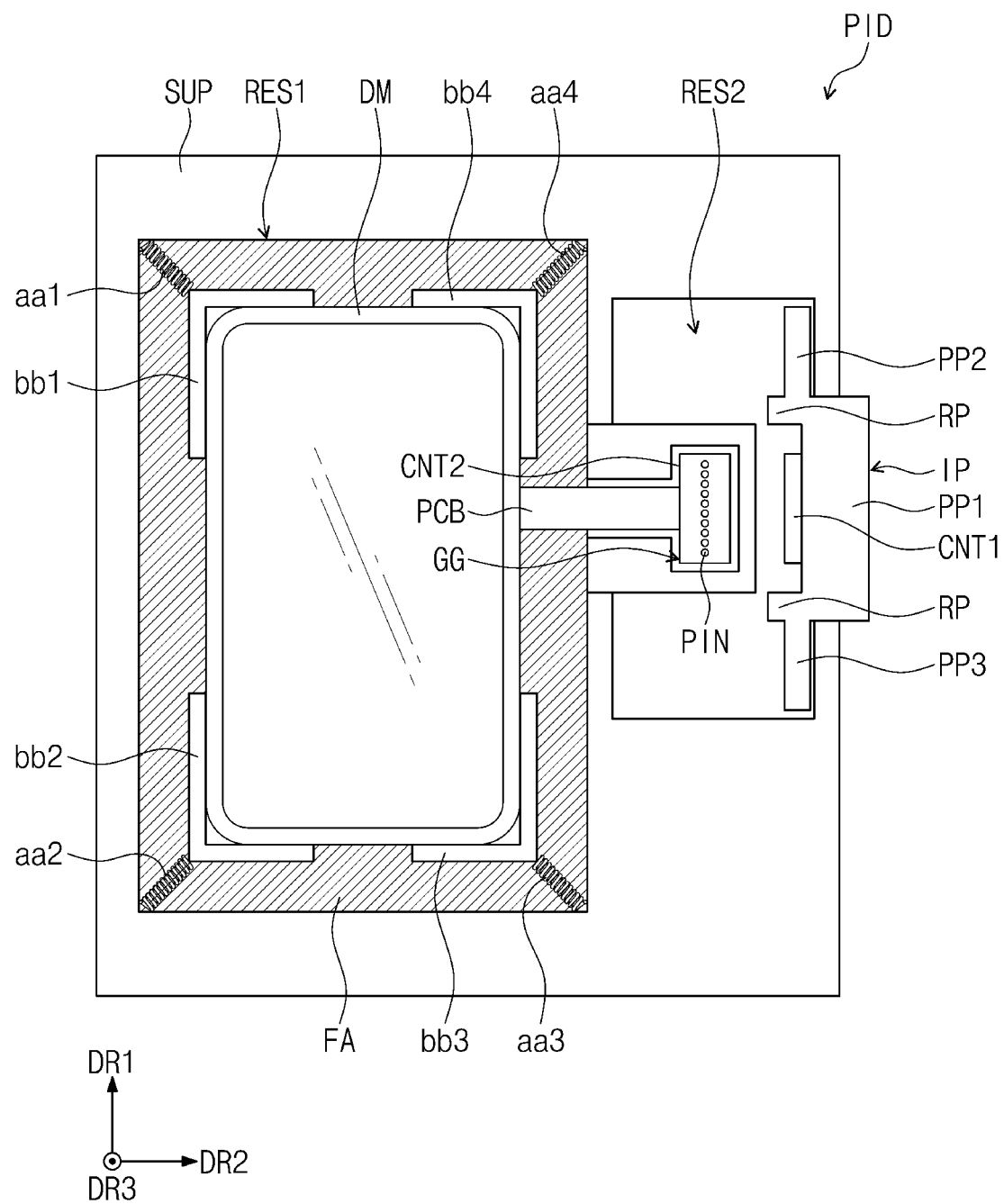
FIG. 5B is a plan view showing a display module placed on an inspection apparatus for a display module according to an embodiment of the present disclosure.

FIG. 5A is a plan view showing the display module placed on the display module inspection apparatus PID according to an embodiment of the present disclosure. FIG. 5B is a plan view showing a display module placed on a display module inspection apparatus PID according to an embodiment of the present disclosure.

FIGS. 5A and 5B show a state in which the display module DM described with reference to FIGS. 4A to 4C is disposed on the seat part SUP of the display module inspection apparatus PID.

Referring to FIG. 5A, the display module DM may have a first length WD1. Lengths of the first, second, third, and fourth variable parts aa1, aa2, aa3, and aa4 may be adjusted by taking into account the first length WD1 of the display module DM, and the display module DM may be disposed on the seat space SP (refer to FIG. 1). The circuit board PCB and the second connector CNT2 may be disposed in the guide groove GG.

The first, second, third, and fourth support parts bb1, bb2, bb3, and bb4 may surround the display module DM.

In an embodiment, the display module inspection apparatus PID may further include a cushion portion FA. The cushion portion FA may be disposed in the first recess part RES1 along the side surface IF (refer to FIG. 1). The cushion portion FA may surround the first, second, third, and fourth support parts bb1, bb2, bb3, and bb4.

The cushion portion FA may assist the first, second, third, and fourth support parts bb1, bb2, bb3, and bb4 to stably support the display module DM. The cushion portion FA may include a flexible material, such as a sponge, a foam, a urethane-based material, or the like. Accordingly, when the length of the variable part AT or the position of the support part BT is changed, a volume of the cushion portion FA may be adjusted in consideration of the changed length of the variable part AT or the changed position of the support part BT.

Figure 6A:
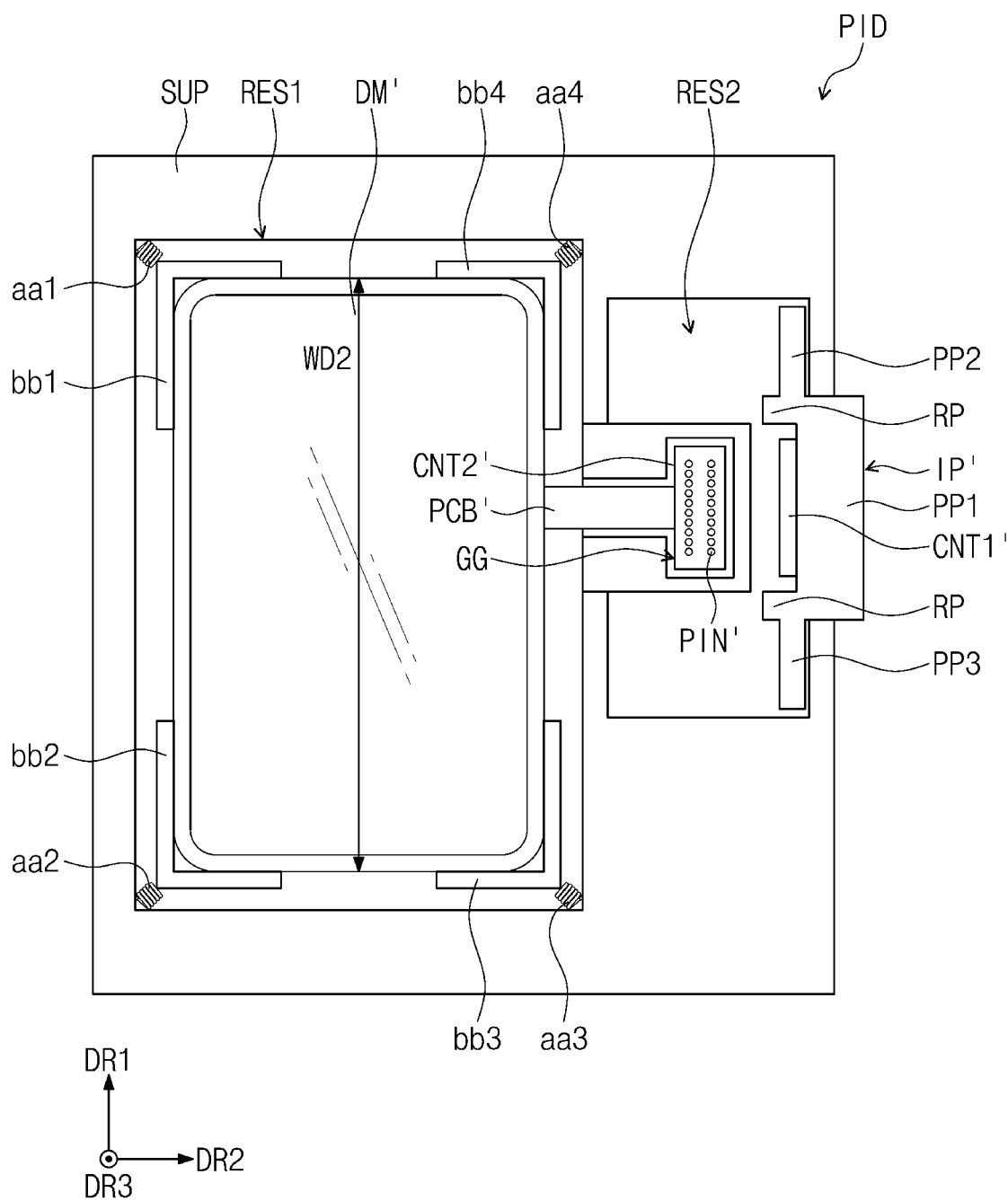
FIG. 6A is a plan view showing a display module placed on an inspection apparatus for a display module according to an embodiment of the present disclosure.
Figure 6B:
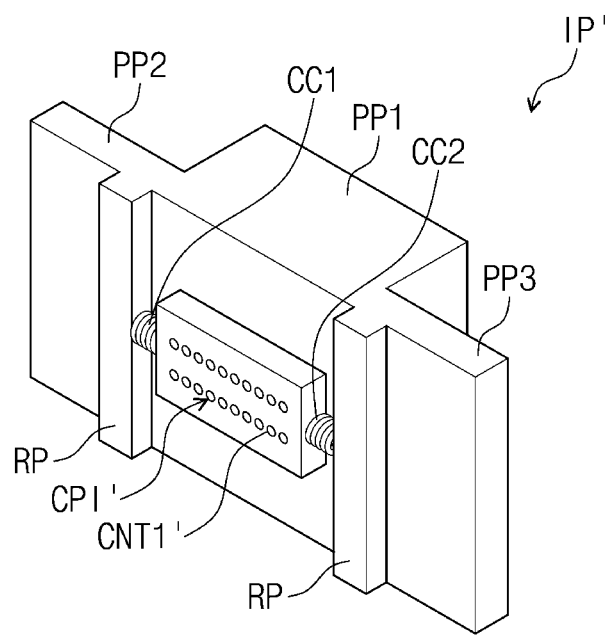
FIG. 6B is a perspective view showing an inspection part according to an embodiment of the present disclosure.
Figure 6B:
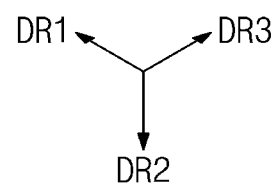

FIG. 6A is a plan view showing a display module DM' placed on a display module inspection apparatus PID according to an embodiment of the present disclosure. FIG. 6B is a perspective view showing an inspection part IP' according to an embodiment of the present disclosure.

FIG. 6A shows a structure in which the display module DM' is disposed on the seat part SUP of the display module inspection apparatus PID. The display module DM' may have a second length WD2 greater than the first length WD1 (refer to FIG. 5A).

Referring to FIGS. 5A and 6A, as the first length WD1 of the display module DM increases to the second length WD2 of the display module DM', the length of each of the first, second, third, and fourth variable parts aa1, aa2, aa3, and aa4 may decrease. As an example, the spring of the first, second, third, and fourth variable parts aa1, aa2, aa3, and aa4 may be further compressed.

In addition, a size of a second connector CNT2' of the display module DM' having the second length WD2 may be greater than a size of the second connector CNT2 of the display module DM having the first length WD1. As an example, the second connector CNT2' may include 2n connection pins PIN', and the second connector CNT2' may be disposed on a circuit board PCB'.

Referring to FIG. 6B, a size of a first connector CNT1' may increase to correspond to a size of the second connector CNT2'. As an example, the first connector CNT1' may include 2n connection pin insertion parts CPI'. As the size of the first connector CNT1' increases, the spring of the first and second sub-variable parts CC1 and CC2 may be further compressed.

The display module inspection apparatus PID may accommodate the display modules DM and DM' of various sizes by adjusting the length of the variable part AT and the sub-variable parts CC1 and CC2.

However, the structure of the display module inspection apparatus PID is not limited to the above descriptions.

Figure 7:
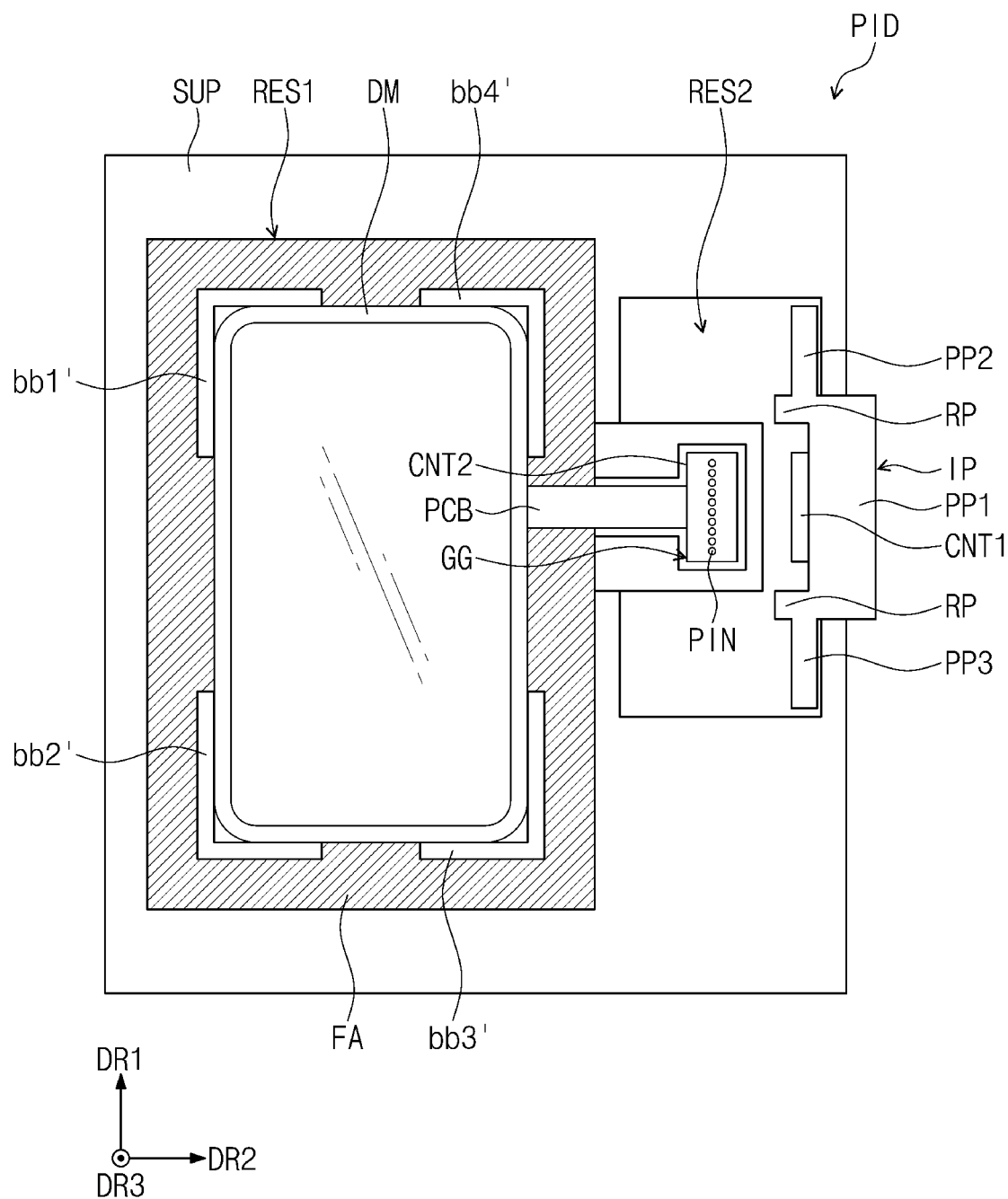
FIG. 7 is a plan view showing a display module placed on an inspection apparatus for a display module according to an embodiment of the present disclosure.

FIG. 7 is a plan view showing a display module DM placed on a display module inspection apparatus PID according to an embodiment of the present disclosure. In FIG. 7, descriptions of the same elements as those shown in FIGS. 1 to 6B may be equally applied to the elements shown in FIG. 7.

Referring to FIG. 7, the display module inspection apparatus PID may include first, second, third, and fourth support parts bb1', bb2', bb3', and bb4' disposed in the first recess part RES1. The first, second, third, and fourth support parts bb1', bb2', bb3', and bb4' may be surrounded by a cushion portion FA.

Each of the first, second, third, and fourth support parts bb1', bb2', bb3', and bb4' may include a shape-memory alloy. As an example, heat may be applied to the first, second, third, and fourth support parts bb1', bb2', bb3', and bb4' to change a shape of each of the first, second, third, and fourth support parts bb1', bb2', bb3', and bb4' and to adjust a size of the seat space SP (refer to FIG. 1). Accordingly, the size of the seat space SP (refer to FIG. 1) may be adjusted to correspond to the size of the display module DM. Descriptions of the other elements, which may be the same as those shown in FIGS. 1 to 6B, will be omitted.

Figure 8:
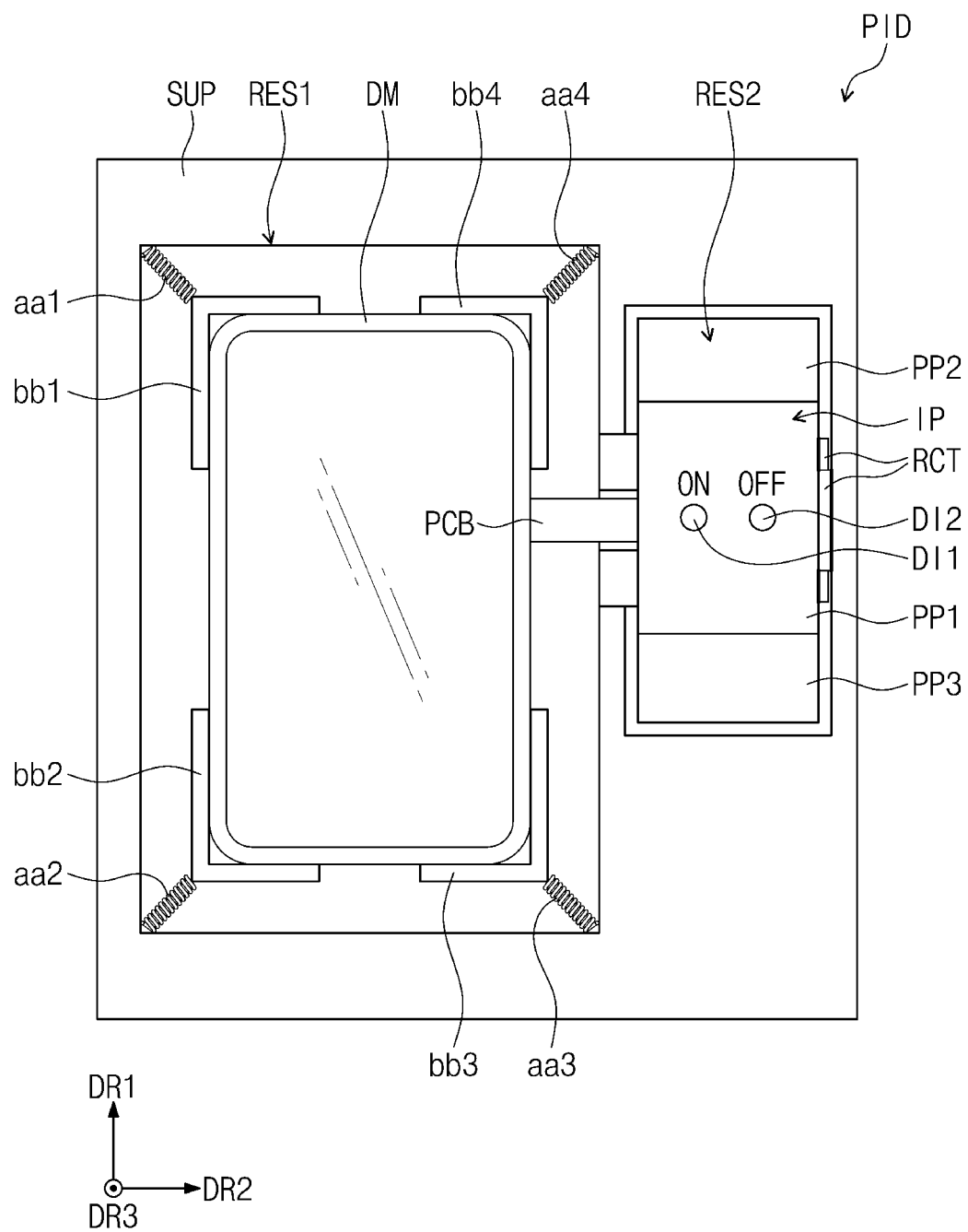
FIG. 8 is a plan view showing an inspection part in a closed state in an inspection apparatus for a display module according to an embodiment of the present disclosure.

FIG. 8 is a plan view showing an inspection part IP in a closed state in a display module inspection apparatus PID according to an embodiment of the present disclosure. The inspection part IP may be disposed in the second recess part RES2.

The second connector CNT2 disposed in the guide groove GG (refer to FIG. 2) may be covered by the inspection part IP. When the inspection part IP is in the closed state, the second connector CNT2 may be connected to the first connector CNT1. The inspection part IP may apply a test signal to the display module DM via the first and second connectors CNT1 and CNT2 connected to each other.

The test signal may be a signal to drive the display panel DP (refer to FIG. 4B) included in the display module DM or to drive the functional layer FC (refer to FIG. 4B). An operation state of the display panel DP (refer to FIG. 4B) or the functional layer FC (refer to FIG. 4B) may be checked in response to the test signal, and the display module DM may be inspected.

In addition, FIGS. 1 to 8 show the structure in which the display module inspection apparatus PID includes the first recess part RES1 and the second recess part RES2; however, the display module inspection apparatus PID may further include a third recess part. A circuit board and a third connector of the display module may be disposed on the third recess part, and, thus, two or more connectors may be inspected.

The display module inspection apparatus may include the variable part and the support part, which are disposed on the seat part, and, thus, the display module inspection apparatus may adjust the size of the seat space on which the display module that is the inspection object is disposed. In addition, the display module inspection apparatus may include the sub-variable part disposed on the inspection part, and, thus, the display module inspection apparatus may accommodate the inspection connectors of various sizes. Accordingly, the display module inspection apparatus may accommodate the display modules of various sizes and may inspect the display modules of the various sizes.

Although some embodiments of the present disclosure have been described, it is to be understood that the present disclosure should not be limited to these embodiments, but various changes and modifications can be made by one of ordinary skill in the art within the spirit and scope of the present disclosure as herein claimed.

Therefore, the disclosed subject matter should not be limited to any single embodiment described herein, and the scope of the present inventive concept shall be determined according to the claims.

What is claimed is:

1. An inspection apparatus for a display module, the inspection apparatus comprising:
   a seat part in which a first recess part having a recessed shape and comprising a bottom surface and a side surface extending from the bottom surface and a second recess part having a recessed shape are defined; and
   an inspection part comprising an inspection connector, the seat part comprising:

a support part having a certain stiffness and located on the bottom surface within the first recess part so as to be spaced apart from the side surface of the first recess part; and a variable part connecting the support part and the side surface, wherein the variable part has a certain elasticity or a portion of the variable part penetrates into the side surface, wherein the first recess part and the second recess part are defined in a same upper surface of the seat part, wherein the second recess part is defined outside of the first recess part, and wherein a seat space is defined by the support part within the first recess part, and a size of the seat space is adjusted according to a size of the display module.

2. The inspection apparatus of claim 1, wherein the variable part comprises a spring or a screw.

3. The inspection apparatus of claim 1, wherein the variable part is provided in plural.

4. The inspection apparatus of claim 1, wherein the variable part comprises a first variable part, a second variable part, a third variable part, and a fourth variable part, the support part comprises a first support part, a second support part, a third support part, and a fourth support part, which are spaced apart from each other, and the first variable part, the second variable part, the third variable part, and the fourth variable part are connected to the first support part, the second support part, the third support part, and the fourth support part, respectively.

5. The inspection apparatus of claim 4, wherein the first variable part, the second variable part, the third variable part, and the fourth variable part are spaced apart from each other.

6. The inspection apparatus of claim 4, wherein the first support part faces the third support part, and the second support part faces the fourth support part.

7. The inspection apparatus of claim 4, wherein the seat part further comprises a cushion part located in the first recess part along the side surface and surrounding the first, second, third, and fourth support parts.

8. The inspection apparatus of claim 1, wherein the inspection part overlaps the second recess part.

9. The inspection apparatus of claim 1, wherein the inspection part comprises two protrusion parts and two sub-variable parts respectively connected to the two protrusion parts, which are located on a surface of the inspection part, both ends of the inspection connector are respectively connected to the two sub-variable parts, and the sub-variable parts have a certain elasticity or a portion of the sub-variable parts penetrates into the protrusion parts.

10. The inspection apparatus of claim 9, wherein each of the sub-variable parts comprises a spring or a screw.

11. The inspection apparatus of claim 1, wherein the support part has a bent-bar shape that is bent at an angle.

12. The inspection apparatus of claim 1, wherein the bottom surface is parallel to a first direction and a second direction crossing the first direction, and the side surface is parallel to a third direction crossing the first and second directions.

13. The inspection apparatus of claim 1, wherein the seat part comprises a metal material.

14. The inspection apparatus of claim 1, wherein the support part comprises at least one of a metal material and a ceramic material.

15. An inspection apparatus for a display module, the inspection apparatus comprising:

a seat part in which a first recess part and a second recess part, each having a recessed shape, are defined in a same upper surface of the seat part; and an inspection part overlapping the second recess part and comprising an inspection connector, wherein the seat part comprises a support part within the first recess part so as to be spaced apart from a side surface of the first recess part and comprising a shape-memory alloy, wherein the second recess part is defined outside of the first recess part, and wherein a seat space is defined by the support part within the first recess part, and a size of the seat space is adjusted according to a size of the display module.

16. The inspection apparatus of claim 15, wherein the support part comprises a first support part, a second support part, a third support part, and a fourth support part, which are spaced apart from each other.

17. The inspection apparatus of claim 16, wherein each of the first, second, third, and fourth support parts has a bent-bar shape that is bent at an angle.

18. The inspection apparatus of claim 16, wherein the seat part further comprises a cushion part located in the first recess part and surrounding the first, second, third, and fourth support parts.

19. The inspection apparatus of claim 16, wherein the inspection connector comprises a plurality of connection pin insertion parts.

20. The inspection apparatus of claim 16, wherein the inspection part comprises two protrusion parts and two sub-variable parts respectively connected to the two protrusion parts, which are located on a surface of the inspection part, both ends of the inspection connector are respectively connected to the two sub-variable parts, and the sub-variable parts have a certain elasticity or a portion of the sub-variable parts penetrates into the protrusion parts.

\* \* \* \* \*